(12) United States Patent
Aiken et al.

(10) Patent No.: US 6,590,640 B1
(45) Date of Patent: Jul. 8, 2003

(54) METHOD AND APPARATUS FOR MAPPING THREE-DIMENSIONAL FEATURES (75) Inventors: Carlos L. V. Aiken, Plano, TX (US); Xueming Xu, Dallas, TX (US)

(73) Assignee: Boards of Regents, The University of Texas System, Austin, TX (US)

( * ) Notice: Subject to any disclaimer, the term of this patent is extended or adjusted under 35 U.S.C. 154(b) by 17 days.

(21) Appl. No.: 09/620,411

(22) Filed: Jul. 20, 2000

(51) Int. Cl.[7] .................................................. G01C 3/08
(52) U.S. Cl. ...................................................... 356/3.01
(58) Field of Search .............................. 356/3.01, 5.05, 356/3.1, 3.11, 3.12; 382/285, 293, 295; 700/163, 183–187, 193–195

(56) References Cited

U.S. PATENT DOCUMENTS

| | | | | |
|---|---|---|---|---|
| 4,908,573 A | * | 3/1990 | Kaufman et al. ........... 324/309 |
| 5,257,203 A | * | 10/1993 | Riley et al. ................. 345/419 |
| 5,418,608 A | * | 5/1995 | Caimi et al. ................ 356/3.01 |
| 5,867,250 A | * | 2/1999 | Baron ......................... 351/212 |
| 5,896,190 A | * | 4/1999 | Wangler et al. ............. 356/4.01 |
| 5,960,118 A | * | 9/1999 | Briskin et al. .............. 382/243 |
| 6,083,353 A | * | 7/2000 | Alexander, Jr. ............. 202/158 |
| 6,147,760 A | * | 11/2000 | Geng .......................... 356/376 |
| 6,298,313 B1 | * | 10/2001 | Trahan ........................ 702/166 |
| 6,359,618 B1 | * | 3/2002 | Heirich ........................ 345/426 |
| 6,442,293 B1 | * | 8/2002 | Ito et al. ...................... 345/419 |

\* cited by examiner

Primary Examiner—Thomas G. Black
Assistant Examiner—Deandra M. Hughes
(74) Attorney, Agent, or Firm—Gardere Wynne Sewell LLP (57) ABSTRACT The present invention disclosed herein provides a three-dimensional mapping apparatus that has a signal emitter to deliver a signal to a target having at least one attribute. The attribute may be a vertical face, a fissure, an overhang or outcrop. The mapping apparatus may also have a signal receiver to receive the signal reflected by the attribute. A signal processor may calculate a coordinate of the attribute relative to a global coordinate.

29 Claims, 4 Drawing Sheets

METHOD AND APPARATUS FOR MAPPING THREE-DIMENSIONAL FEATURES

TECHNICAL FIELD OF THE INVENTION

This invention relates in general to the field of three-dimensional mapping and, in particular to, a method and apparatus for using continuous triggering, pulse laser reflectorless rangefinders to map three-dimensional features.

BACKGROUND OF THE INVENTION

Without limiting the scope of the invention, its background will be described with reference to mapping three-dimensional geological features as an example.

Early man developed mapping techniques to define their world. Maps defined boundaries, aided trade, and allowed others to retrace the steps of explorers who had gone before them. All of these uses advanced civilization and improved the quality of life for much of the population.

As civilization advanced, so did map making technology. World exploration and military conquests fueled the need for more accurate maps. Mathematics and science allowed cartographers to take more precise measurements of features of the earth. These measurements led to better spatial relationships among geological features, which resulted in more accurate maps.

Aerial and satellite photography have changed the way people view their world. Pictures taken from above a particular location sometimes reveal that geological features are not actually as they appear on maps. The curvature of the Earth tends to compound this anomaly. Most of the differences are a result of representing a three-dimensional curved surface, i.e., the Earth, as a two-dimensional drawing. The differences are usually inconsequential for the average tourist on vacation with his family. Scientists and engineers, however, encounter more significant problems because of inaccurate maps. In the petroleum industry, for example, millions of dollars may be wasted on a dry hole because geological data is flawed. Three-dimensional models of particular geological features can enhance analysis accuracy and prevent mistakes caused by flawed data.

Although aerial photography has improved the accuracy of maps, it is limited by the orientation of geological features. Vertical features and overhangs, for example, are not accurately captured using aerial photography. Three-dimensional models of these features cannot be accurately generated with aerial photographs because the features cannot be observed if the camera is vertically oriented. Oblique photographs, which may be taken from the ground, create the best images of vertical features. However, current three-dimensional modeling techniques cannot model a feature using an image taken from an oblique angle.

Near-vertical and overhanging features are also difficult to represent spatially because a researcher must first locate a Global Positioning System(GPS) receiver on the feature before it can be located. These features may be difficult or impossible to accurately measure because of rugged terrain. However, researchers may easily study features located in rugged terrain if they have a three-dimensional photorealistic model. These models, however, may not be accurate. Furthermore, the systems used to generate the models are generally very expensive. Some of these three-dimensional photorealistic modeling systems that are currently available use laser range finders to locate a remote geological feature. The most common system transmits a laser beam to a point on the feature and calculates the distance from the transmitter to the point. These systems are limited because they inefficiently take point by point measurements of a feature. The researcher will occasionally return from the field to find that one or more of the points measured is not the desired point. A failure to capture a desired point or points causes added costs and frustration because the researcher must return to the field to gather the correct data at locations that are most often very remote.

These three-dimensional photorealistic modeling systems are also limited by the number of data points that may be taken. The researcher must aim and trigger the transmitter for each desired point. Important points will be missed frequently because the researcher does not realize the significance of the point. Sometimes an important point will be overlooked completely and other times the researcher will not understand the significance of the point until the data has been reviewed in the laboratory.

Another system attempts to compensate for these inadequacies by gathering millions of data points over a given area. This system is very expensive and acquires many unnecessary data points. Although the system may paint a virtual image of the terrain, points on the image are not referenced to a known position. This information is relatively useless to a researcher because it is not correlated with other necessary or useful geological information. Furthermore, it is limited to short distances because of the large amount of useless data that is captured.

Another system uses stereographic photography or photogrammetry to model surface geometry. Such systems require multiple overlapping photographs taken at different known angles to create a stereographic view. Furthermore, photogrammetry equipment is expensive and complicated. Also, features on the resulting image are not referenced to a global position.

Therefore, a need has arisen for a mapping apparatus that does not have the expense and accuracy limitations of present mapping systems. A need has also arisen for a three-dimensional mapping system that is not constrained by a vertical camera angle. A need has also arisen for a three-dimensional mapping apparatus that does not require a researcher to physically locate a GPS receiver on a geological feature to locate the feature within a global coordinate system. A need has also arisen for such mapping apparatus that does not require a researcher to process data in the laboratory to determine if desired data points were inadvertently omitted. Further, a need has arisen for a mapping apparatus that does not fail to integrate useful information into a photorealistic model.

SUMMARY OF THE INVENTION

The present invention disclosed herein provides a three-dimensional mapping apparatus that has a signal emitter to deliver a signal to a target having at least one attribute. The attribute may be, for example, a vertical face, a fissure, an overhang or outcrop. The mapping apparatus will also have a signal receiver to receive the signal reflected by the attribute. A signal processor calculates a coordinate of the attribute relative to a global coordinate.

In one embodiment of the present invention, a method for mapping three-dimensional features includes transmitting a signal to a target and receiving a component of the signal that is reflected from the target. Signal data may be processed to determine a coordinate of the target.

In another embodiment of the invention, a three-dimensional mapping system includes a signal transmitter and a signal receiver. A Global Positioning System (GPS) may be used to determine the locations of the transmitter and receiver. A computer having a software program may be used to coordinate a data point from the signal receiver with a second data point from the Global Positioning System.

In yet another embodiment, a system for rendering a three-dimensional image may include an oblique image of a target having a control point. A coordinate of the control point relative to a known point may be determined by, for example, a Global Positioning System. A computer may correlate the coordinate of the control point to the oblique image of the control point.

In another embodiment, a mapping apparatus has a signal emitter to deliver a continuous signal to a target having at least one attribute. In geological formations, the attribute may be an outcrop, a fissure or an overhang, for example. A signal receiver continuously receives a component of the signal reflected by the attribute and a signal processor may calculate a coordinate of the attribute relative to a known coordinate. The known coordinate may be determined by a Global Positioning System.

In yet another embodiment, a method of mapping a target includes the steps of deploying a mapping apparatus and remotely commanding the mapping apparatus to emit a signal to the target. Data may be transmitted from the mapping apparatus to a remote location such as a classroom or a laboratory, for example.

In another embodiment, a mapping apparatus has a signal emitter to deliver a continuous signal to a target, which has at least one attribute. A signal receiver may continuously receive a component of the signal reflected by the attribute and a signal processor may calculate a coordinate of the attribute relative to a known coordinate. An oblique image of the target may be combined with the known coordinate.

In yet another embodiment, a method for mapping three-dimensional features may include transmitting a signal to a target and receiving a component of the signal that is reflected from the target. The component of the signal may be processed to determine a coordinate of the target and a first reference point may be assigned to a coordinate of the target. An oblique image of the target, which has a second reference point, may be coordinated with the first reference point to superimpose the oblique image over the coordinate. A map of the target may be generated by coordinating the first reference point with the second reference point on the oblique image.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
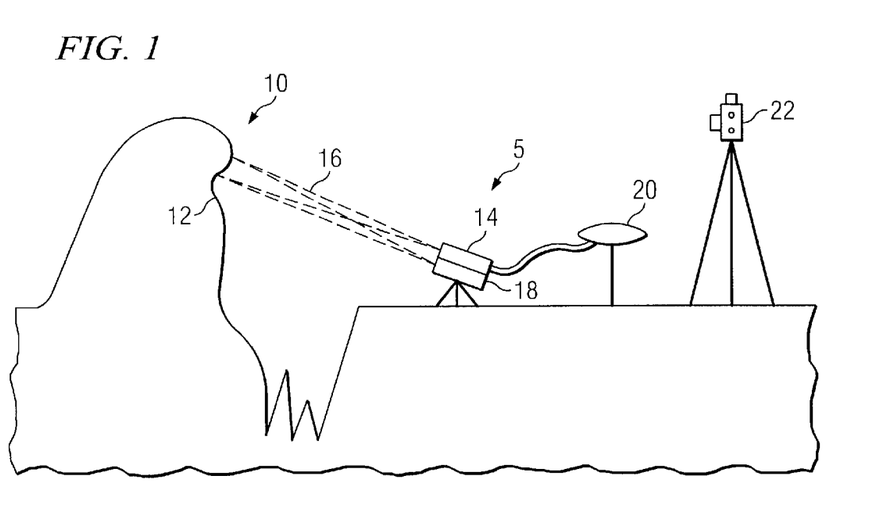
FIG. 1 is an illustration of a land-based mapping apparatus incorporating certain embodiments of the invention.

Referring now to FIG. 1, therein is depicted an illustration of a mapping apparatus 5 incorporating certain embodiments of the invention. Mapping apparatus 5 may be used to develop a three-dimensional image of a target 10. Target 10 may have an attribute 12 that is of interest to a researcher, scientist or engineer. An emitter 14 in mapping apparatus 5 emits a signal 16 to target 10. Signal 16 impinges on attribute 12 and may be reflected to a receiver 18 in a continuous manner. By "continuous" manner it is meant that data acquisition is continuous with the emission, reflection and reception of mapping data at the data rate of reception. As will be apparent to those skilled in the art of data acquisition, the data capture rate may be varied according to the resolution required by the user. That is, if more resolution is required, more data points are gathered, continuously, per unit time. The amount of data captured may be limited by the storage capacity of the memory storage device connected to receiver 18. Data may, however, also be transmitted from receiver 18 directly to a remote storage device in a laboratory, for example. Mapping apparatus 5 may then export data to be analyzed or process the data internally to determine a distance and angle from receiver 18 or emitter 14 to attribute 12. A GPS unit 20 is used to determine the location of receiver 18 or emitter 14 relative to a global position.

Although target 10 is illustrated as a geological formation, target 10 may be any physical object. For example, mapping apparatus 5 may be used to produce a photorealistic three-dimensional image of biological material such as a cell or tissue. If small structures such as cell membranes are mapped, mapping apparatus 5 may be used in conjunction with a microscope. Other targets 10 may include man-made objects such as buildings or natural objects such as trees. Attributes 12 of target 10 may include any interesting feature of target 10 that a user wants to study, regardless of its size or complexity. Some examples of attributes 12 are fissures, interfaces or anomalies of target 10.

Emitter 14 and receiver 18 may be separate or housed in a single unit. In one embodiment of the present invention, emitter 14 and receiver 18 are housed concentrically in a continuous triggering, pulse laser reflectorless rangefinder. This rangefinder may continuously emit signal 16 that is a pulse laser. In continuous operation, the rangefinder may sample multiple data points from attribute 12 on target 10. These multiple data points afford a redundant system to model detailed information about attribute 12.

Used for years in the survey and utility industries, the laser rangefinder is light-weight and can be steadied by the use of a monopod, bipod or tripod. Laser rangefinder configurations with electronic theodolites may be used for more accurate angle measurements. Reflectorless total stations may also be used, although they are less portable and more expensive. One advantage of the present invention is that one person can carry, set-up and operate the invention. The laser rangefinder may be used to locate individual points or, in the "trigger on" mode, can trace a feature by continuous pulsing at 2 to 4 Hz, for example. The fact that these data can be globally referenced with GPS 20 and integrated with digital maps and images in real-time makes such an integrated system a powerful field tool.

Continuous pulsing acquires multiple points related to attribute 12. Multiple points are especially helpful if attribute 12 has details that are not apparent to a researcher in the field. Further analysis in a laboratory may reveal evidence of a concealed detail of attribute 12. The multiple points create an accurate model of the attribute 12 and save the researcher the time and expense of another trip to target 10. This becomes particularly important if target 10 is located in remote or hostile environments. The accurate model of attribute 12 allows the researcher to study target 10 from the comfort and safety of the laboratory. Additionally, other researchers, students and the public may have access to the same detailed and accurate model of target 10 from any location.

The laser rangefinder may have an internal compass and inclinometer so that the orientation of emitter 14 and receiver 18 may be ascertained. Signal 16 parameters define the distance to attribute 12 and actual coordinates of attribute 12 may be determined by using GPS 20. Mapping apparatus 5 may calculate the coordinates of attribute 12 relative to a global position because GPS 20 can locate the global position of emitter 14 and receiver 18. All continuously acquired data points (x, y, and z relative to a fixed, known position) may consequently be assigned coordinates in a global coordinate system.

A camera 22 may also be incorporated into the system to generate an image of target 10. Camera 22 may capture an analog or digital image of target 10. The image may be correlated with data points gathered by the rangefinder to build a realistic three-dimensional image of target 10. A computer may be used to fit reference points of the image to their appropriate coordinates, which are determined and captured by the rangefinder.

One advantage to the present invention is the distance at which accurate measurements may be taken. Some targets 10 may be impossible to accurately map using conventional techniques. For example, attributes 12 may be located on the side of a vertical cliff several hundred meters above the ground. Conventional mapping techniques may require the researcher to locate GPS 20 on attribute 12. Safety and time constraints may prevent the researcher from mapping such a hostile or unreachable attribute 12. Mapping apparatus 5, however, easily acquires accurate measurements over long distances. The researcher, consequently, may be located at a convenient and safe location.

For some extremely hostile environments, one embodiment of the present invention contemplates an autonomous, deployable mapping apparatus 5. Mapping apparatus 5 according to this embodiment may integrate emitter 14, receiver 18, GPS 20, camera 22 and a transmitter (not shown). Mapping apparatus 5 may be deployed as a single unit or as various components from the air, sea or space. A parachute may drop mapping apparatus 5 at a location within sight of target 10. Alternatively, a remotely operated vehicle may deploy mapping apparatus 5 to target 10 or mapping apparatus may be carried to a location by an operator.

Scanning target 10 with signal 16 may be done automatically or remotely. Stepper motors mounted to the laser rangefinder may adjust the horizontal and vertical orientation to acquire data from target 10. The motors may also orient camera 22 to capture an image of target 10. Data may also be acquired from target 10 by manually aiming mapping apparatus using an optical sight such as a scope or a video camera, for example. The scope may be telescopic to acquire data from targets at long distances. The acquired data may be stored in mapping apparatus 5 or transmitted back to a base station, the laboratory or a classroom. A photorealistic, three-dimensional image may be generated and studied in real-time as mapping apparatus is acquiring data points and imaging target 10 using camera 22.

The combination of these technologies could be considered sufficient to capture geologic data. However, the actual image of the physical surface, which may be captured by photography, digitally, or by analog, may be necessary to fully describe the surface geology. Geographic software, such as GEOGRAPHIC INFORMATION SYSTEM® (GIS), for example, GPS 20, camera 22, a portable computer, and a laser rangefinder may be used to perform several different tasks. The laser rangefinder may be used to capture particular geological features, such as stratigraphic contacts, faults, terrain or, other attributes 12 of target 10. The rangefinder may be used either alone with data recorded in it or by directly connecting it to a field computer through, for example, an R232 port. Software that allows data transfer among different sources and programs enables data to be recorded as shape files, which are easily displayed and queried.

The survey points are associated with certain attributes 12 identifying target 10 that is mapped and may be displayed on a screen in real-time. A direct correlation between x, y, z points captured by mapping apparatus 5 and, e.g., a video or photograph of target 10 makes it possible to visualize, verify and analyze at the time of data acquisition. The field survey can map terrain, as well as planar, linear, and point features and the spatial relationships between them. All of these data can be collected as quickly as the operator can aim and shoot.

As mentioned above, the laser rangefinder has the ability to collect individual point data or can operate in the continuous mode so that the operator may draw a feature in three dimensions. This is equivalent to making a sketch in a notebook but with three-dimensional positions for this "laser sketch."

Terrain may be mapped by the laser rangefinder in various patterns. One method is by defining break points and breaklines where significant slope changes occur. Planar surfaces, such as bedding, and faults may be mapped, and strike and dip relationships and stratigraphic thicknesses between planar surfaces can be determined, even in real time. Strike and dip determination may be calculated using the principle of the three-point problem, in which a least squares fit of a plane may be applied to the specific data points defining the feature.

GPS 20 correlates the laser rangefinder data points and references them globally. If attribute 12 can be occupied, GPS 20 may be used to map its position. A geological attribute 12 may also be traced by walking it out with GPS 20. Alternatively, a person standing on attribute 12 may position that point with GPS 20 and then use the laser rangefinder to map the trace of attribute 12 everywhere attribute 12 can be observed. On-the-fly GPS 20 and laser rangefinders may also be used to simultaneously or alternatively map terrain.

Another advantage to the present invention is cost. Laser rangefinders, GPS 20, camera 22 and a computer processor may be integrated for much less than known alternative systems. Readily available, inexpensive components make mapping apparatus 5 ideal for scientific and educational institutions. Commercial users will also appreciate significantly lower costs in addition to obtaining significantly greater capabilities of mapping apparatus 5.

Figure 2:
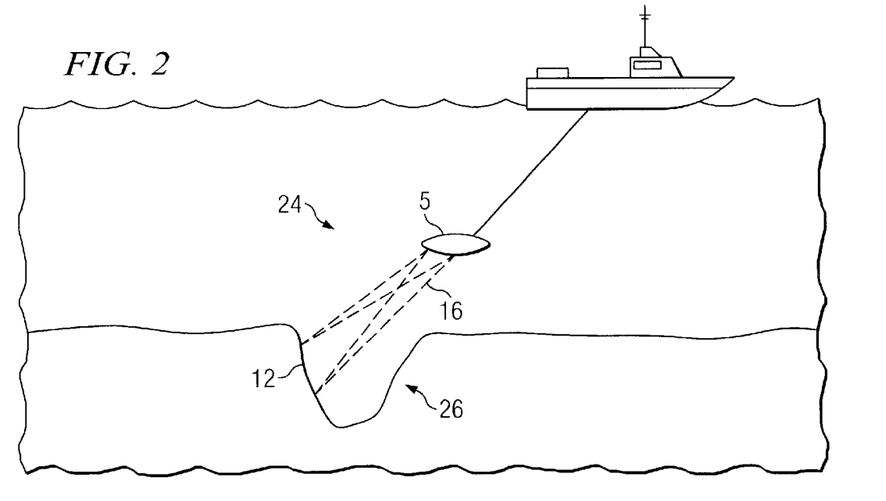
FIG. 2 is an illustration of a sea-based mapping apparatus incorporating certain embodiments of the invention.

FIG. 2 illustrates a sea-based mapping apparatus 5 incorporating certain embodiments of the invention. Mapping apparatus 5 may be housed in a waterproof body, which may be deployed by a submarine or towed by a boat. Attribute 12, which is located on the sea floor in this example, may be mapped by towing mapping apparatus 5 over a submerged target 26. Emitter 14 may transmit signal 16 using, e.g., a blue-green laser or a xenon flash bulb, for example. A xenon flash comprises multiple wavelengths that may be detected by receiver 18 through water. Data may be transmitted to researchers on the submarine or boat. Data may also be transmitted to researchers or students in laboratories or classrooms around the world.

Figure 3:
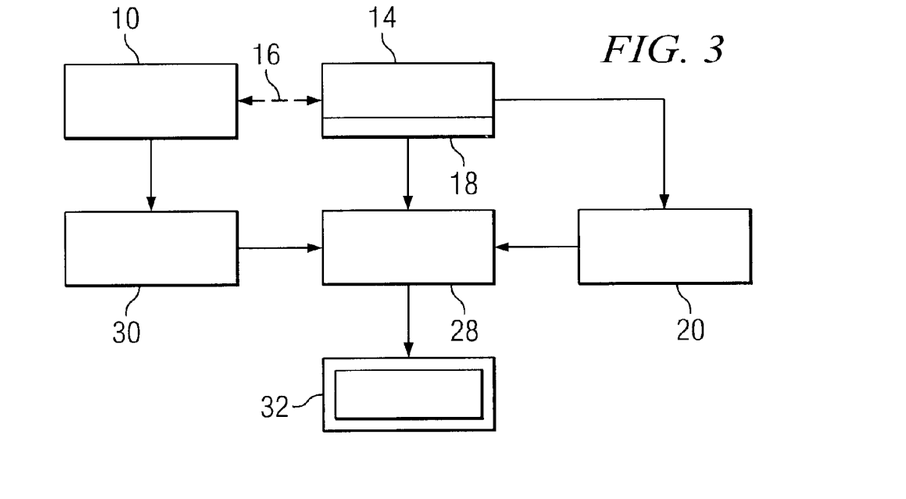
FIG. 3 is a schematic diagram of a mapping system incorporating certain embodiments of the invention.

FIG. 3 illustrates a schematic diagram of a mapping system to create a photorealistic three-dimensional image of target 10. Emitter 14 transmits signal 16 to target 10. A portion of signal 16 may be received by receiver 18, which inputs the data from returned signal 16 into processor 28. The data may contain distance, elevation and compass bearing components. GPS 20 determines the position of emitter 14 and receiver 18, which is also input to processor 28. An image 30 of target 10 may be from camera 22 or it may be from an existing photograph. Image 30 may be created in digital format or it may be scanned into a digital format from an analog picture. Processor 28 may then correlate information from emitter 14, receiver 18, GPS 20 and image 30 into a three-dimensional model that has spatial and visual properties that accurately represent target 10.

Figure 4:
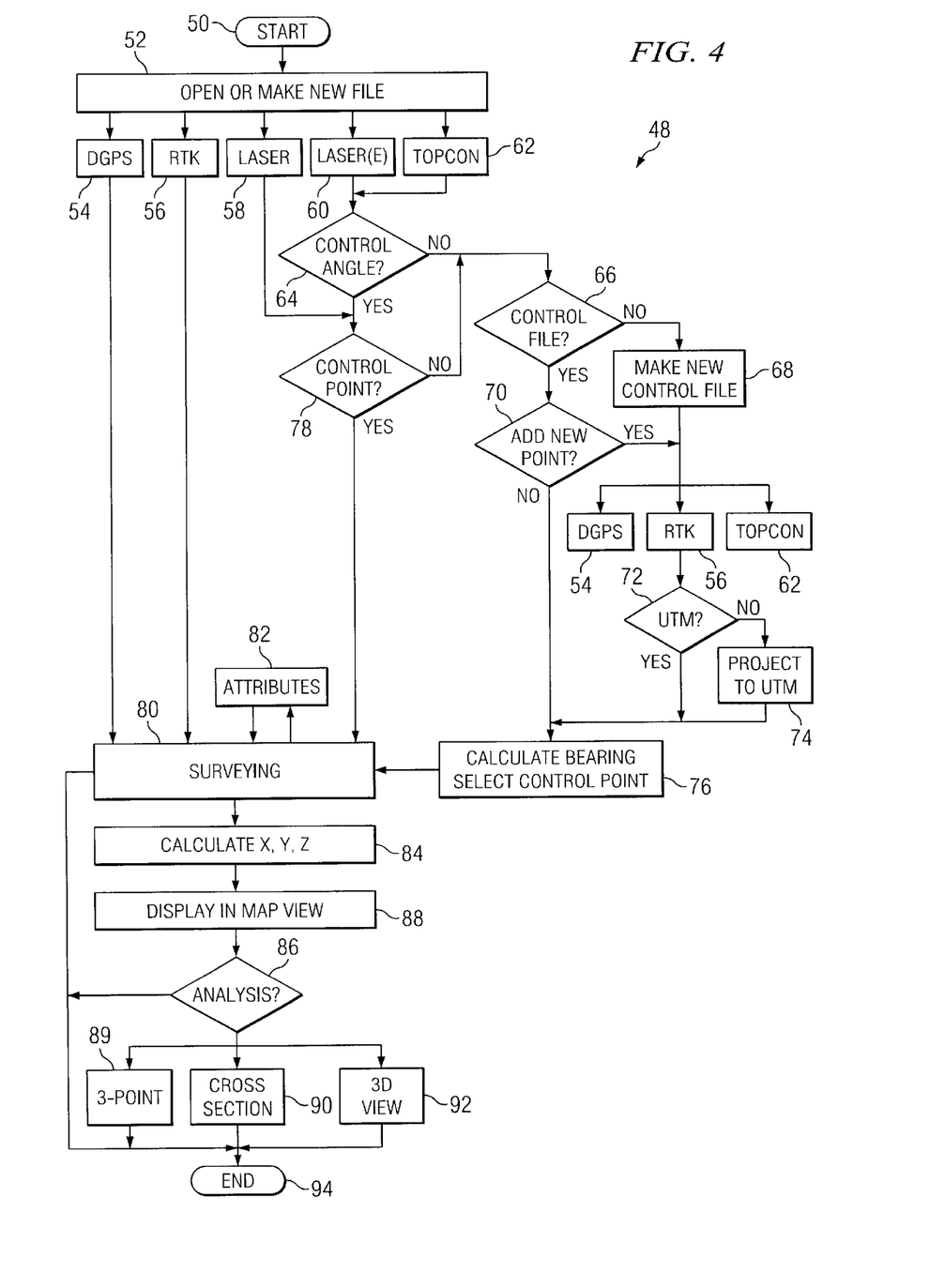
FIG. 4 is a flow chart illustrating a data acquisition process incorporating certain embodiments of the invention.
Figure 5:
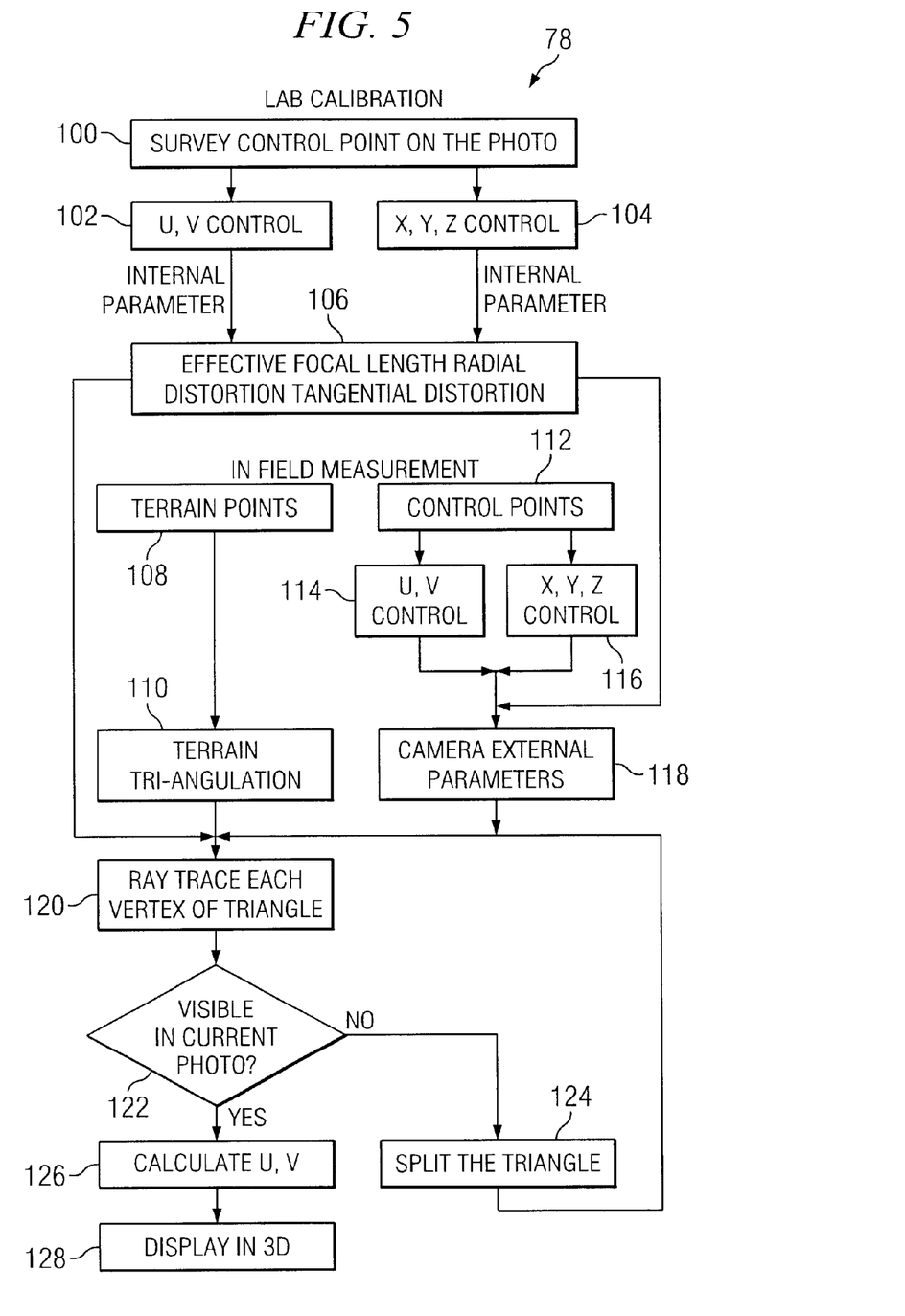
FIG. 5 is a flow chart illustrating a photorealistic three-dimensional rendering process incorporating certain embodiments of the invention.

FIGS. 4 and 5 illustrate one embodiment of correlation processes for data acquisition and photorealistic three-dimensional rendering. Mapping software 48, may be built in VISUAL BASIC® by using MAPOBJECTS® ACTIVEX® control from ESRI®, as an example. One advantage to MAPOBJECTS® is that MAPOBJECTS® is the ACTIVEX® control having built-in major GIS® functions. GIS® may be used as a platform to manage the spatial data because it combines visualization with data management. For three-dimensional visualization support, a trackball mouse handler may be used in conjunction with the software. The trackball allows a user to view the three-dimensional data from different points-of-view in real time.

Mapping software 48 may record measurements from external devices in ESRI® SHAPEFILE® format to facilitate transport into major GIS® databases. The parameters of each measurement may be recorded in the SHAPEFILE® DBASE® database, so each point may be associated with multiple pieces of information.

Supported external devices may be, for example, laser rangefinders from LASER ATLANTA® ADVANTAGE CL®, TRIMBLE®, LEICA® and SPECTRA PRECISION® GPS receivers and the TOPCON® GPT-1002® total station. Features of mapping software 48 may comprise:

(1) Input of GPS NMEA format data. Most GPS receivers can export NMEA formatted positions through a communication port. For those RTK systems that do not support NMEA format, its position may be manually keyed into mapping software 48. The GPS measurement can be used for feature mapping, positioning stations or determining the backsight position for the laser rangefinder or total station. AR GPS positions may be automatically converted to standard LTTM coordinates.

(2) May accept laser measurements in either single mode or continuous mode. These measurements may be automatically displayed on the screen in a map view. The horizontal angle measurement may be from an internal compass or angle encoder. An angle encoder requires that a backsight station be selected.

(3) May accept TOPCON® total station measurements. By default, the tracking mode in a TOPCON® reflectorless total station makes range measurements but not angle measurements. Mapping software 48 may control the single shot mode, generating range and angle measurements continuously with sampling rate of one second. Therefore, mapping software 48 can simulate the continuous shot mode of the laser gun and can trace features or topography.

(4) Strike and dip calculations by first-order trend surface fitting through the data points may be performed by mapping software 48 in the field in real time.

(5) The trackball mouse may be used to rotate three-dimensional data in different directions.

(6) A cross section view of the survey data is generated in the field in real time by projecting the data into the user defined view plane.

Alternatives to MAPOBJECTS® are also available. Mapping software 48 may use MAPOBJECTS® because it has numerous sophisticated GIS® functions, so it is not necessary to program them. Other programming languages such as JAVA® may be more compatible with a smaller, portable mapping apparatus 5. Mapping software 48 written in JAVA® may be independent of system environment and contain variety of desirable, built-in two- and three-dimensional graphic functions. Mapping software 48 programmed in the Java environment may be system independent and allow more robust analyses in the field with smaller, less expensive mobile computers. Other methods of programming mapping software 48 will be apparent to those with ordinary skill in the art.

As illustrated in FIG. 4, mapping software 48 starts at block 50 and allows a user to create a new file in block 52. The new file may contain data from various instruments such as real time differential GPS (DGPS) 54, real time kinematic GPS (RTK) 56, a laser 58, a laser(E) 60, which may be a continuous triggering, pulse laser reflectorless rangefinder, or a TOPCON® 62, reflectorless total station. Presence of a control angle for laser(E) 60 or TOPCON® 62 may be determined in decision block 64. If no control angle is present, presence of a control file may be determined in decision block 66. A new control file may be made in block 68 if no control file is present. If new control file is made in block 68 or if decision block 70 determines a new point is added, DGPS 54, RTK 56 or TOPCON® 62 data are evaluated for orientation to the Universal Transverse Mercator (UTM) in decision block 72. Coordinates from DGPS 54, RTK 56 or TOPCON® 62 may be converted to the UTM in block 74. If coordinates are formatted in the UTM or a control file is present but no new point has been added, a bearing is calculated and a control point is selected in block 76. Block 80 performs surveying calculations which incorporates attributes in block 82 and calculates x, y and z coordinates of the control point in block 84. Attributes from surveying in block 80 may be analyzed in decision block 86 and may be displayed in a map view in block 88 or analyzed in three-point 88, cross-section 90, or three-dimensional view 92. The process may end in block 94 after the surveying process 80 or after analysis in three-point. 88, cross-section 90, or three-dimensional view 92.

FIG. 5 illustrates one embodiment of the survey process is in block 80. Surveying a control point on image 30 may include establishing a two-dimensional u, v control in block 102 and a three-dimensional x, y, z control in block 104. Internal parameters of camera 22 such as effective focal length, radial distortion, and tangential distortion, for example, may be determined or assigned in block 106. These parameters may be used to correlate two-dimensional features captures by camera 22 with three-dimensional features of target 10. Data points on target 10 may be gathered in block 108 using the laser rangefinder. These data points may be used to triangulate locations on target 10. Control, points may be assigned to target 10 in block 112. These points may be easily identified features that may be located on target 10 and in image 30. A two-dimensional u, v control may be assigned to the control point in block 114 and a three-dimensional x, y, z control may be assigned in block 116. These controls are correlated with the external parameters of camera 22 in block 118. Triangulated locations of target 10 may be combined with control points on target 10 and image 30 to produce a ray trace of each vertex of the triangulated locations in block 120. If the ray trace is not visible in image 30 as determined in decision block 122, the triangulated area may be split in block 124. The split triangulated location may be ray traced again in block 120 until the ray trace is visible in image 30. If ray trace is visible in image 30, a two-dimensional u, v coordinate calculated in block 126. This information may be used in block 128 to display a three-dimensional image of target 10.

Figure 6:
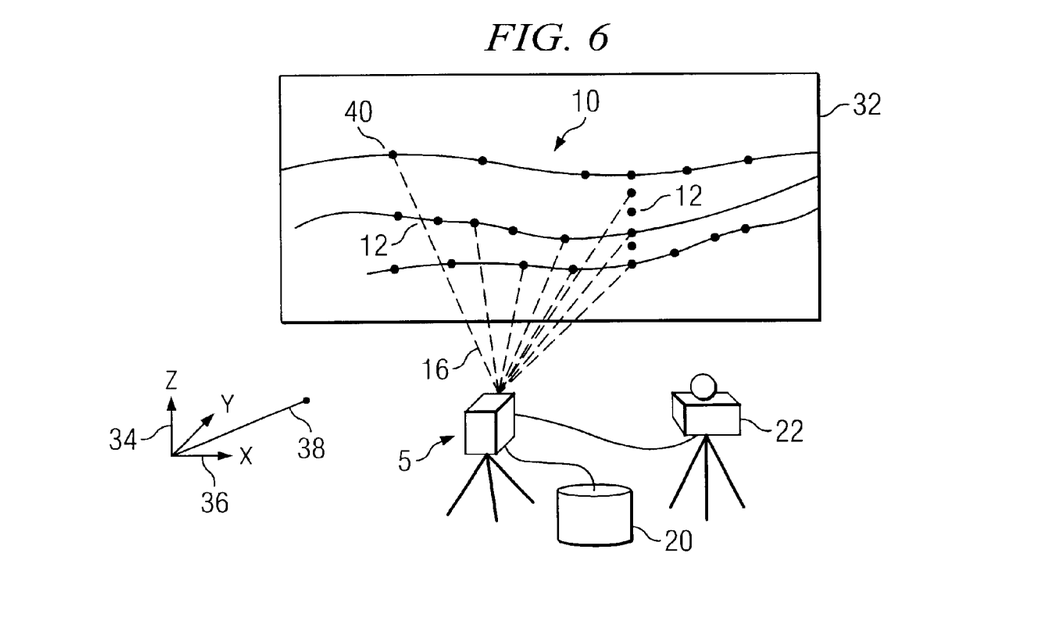
FIG. 6 is an illustration of a mapping system incorporating certain embodiments of the invention.

Turning now to FIG. 6, a mapping system incorporating certain embodiments of the invention is illustrated. Mapping apparatus 5 may emit a continuous signal 16 to target 10. Attribute 12 may reflect a portion of signal 16 back to mapping apparatus 5. The distance from mapping apparatus 5 to attribute 12 may be determined and output from mapping apparatus as data. An azimuth 34 and a compass bearing 36 may also be determined by circuitry within mapping apparatus 5. The distance, azimuth 34, and compass bearing 36 define a locating vector 38, which establishes a location of attribute 12 relative to mapping apparatus 5. Attribute 12 may be referenced globally by determining the global position of mapping apparatus 5 using GPS 20. Processor 28 may then correlate the a reference point 40 visible on image 30 with the global coordinates of reference point 40. Several reference points 40 may be used to drape image 30 over the coordinates of attributes 12.

Draping is a texture mapping process that aligns image 30 onto a surface using reference points 40. Images 30 acquired by a geologist in the field are generally highly oblique outcrop photographs, and subject to camera 22 distortions. "Oblique" angles may be any angle other than a vertical angle. Photographs taken from above target 10, for example, are usually close to vertical. Conversely, photographs taken from the ground are oblique angles. Because images may be taken directly from camera 22, the distortion factors of camera 22 may be corrected by processor 28. Two types of distortion may be corrected: radial and tangential distortion. Radial distortion may be calibrated through the standard checkerboard or analytic method, which is known by those having ordinary skill in the art. Both radial and tangential distortions may be solved through an analytic method. A four-step calibration procedure for implicit image correction may also be used. The intrinsic and extrinsic camera parameters may be implicitly solved by an initial linear approximation and then a nonlinear minimization may refine these parameters. Other methods of correcting for internal camera parameters will be apparent to those having ordinary skill in the art.

After these parameters have been determined, photographs may be draped onto the terrain model, which is defined by attribute 12 coordinates, to produce a three-dimensional "virtual outcrop". A view-based rendering system that produces three-dimensional renderings from range and color data may be used. A triangle mesh of target 10 may be modeled using data related to attributes 12. The color information may be taken from a composite of three neighboring images 30. A visibility test may be done through ray tracing. The resulting rendered three-dimensional map may be greatly enhanced by soft z-buffer blending, for example.

Alternatively, a view-dependent image based rendering system that is implemented using projective texture mapping may also be used. This technique generates novel views of attribute 12 having approximately known geometry, making maximal use of a sparse set of original views.

A "virtual outcrop" may be generated based on a terrain model determined through GPS 20 locations and reflectorless laser total station. Color information of the terrain model may be sampled through the calibrated photograph. Mapping apparatus 5 may produce three-dimensional photorealistic outcrops. A user may "walk" through the virtual outcrop surrounded by a virtual environment. The outcrop may then be lifted so the user can see through the associated subsurface produced by projecting surface data. The digital laser "sketches" on the photograph become true three-dimensional coordinates. Subsurface projections may be based on critical orientation data. Therefore, the whole virtual outcrop may be transmitted into the office for further study.

Mapping apparatus 5 may be implemented in the field by a number of different methods. According to one embodiment, data collection may require equipment in addition to mapping apparatus 5, and GPS 20. A standard operating procedure according to one method of practicing the invention may require two tripods for camera 22 and GPS 20, orange flagging and spray for marking locations, five wooden stakes having a nail in the middle for defining boundaries, and a machete for clearing tall grass or brush, which may obscure target 10 or attribute 12. Other necessary attendant equipment will be obvious to those having ordinary skill in the art.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:

1. A system for rendering a photorealistic three-dimensional model of a target comprising:
    a target having two or more target control points;
    an oblique image of the target, said image having two or more image control points;
    a continuous triggering, laser reflectorless rangefinder;
    a signal receiver disposed to receive a reflected signal from the target; and
    a computer programmed to correlate a coordinate of each target control point with the corresponding image control point.

2. The system of claim 1 further comprising a Global Positioning System to reference the coordinate to a global coordinate system.

3. The system of claim 1, wherein the coordinate of each target control point is established using a xenon flash lamp.

4. The system of claim 1, wherein the continuous triggering, laser reflectorless rangefinder has an aiming device.

5. The system of claim 1 wherein the computer renders a photorealistic image of the target having data associated with a point on the oblique image.

6. A mapping apparatus for rendering a photorealistic 3-D model of a target comprising:
- a continuous triggering, laser reflectorless rangefinder to deliver a continuous signal to a target having two or more target control points;
- an oblique image of the target, wherein the image has two or more image control points;
- a signal receiver disposed to receive a component of the signal reflected from the target and
- a signal processor to correlate a coordinate of each target control point with a corresponding image control point.

7. The mapping apparatus as recited in claim 6 further comprising a Global Positioning System.

8. The mapping apparatus as recited in claim 6 wherein the mapping apparatus is portable.

9. The mapping apparatus as recited in claim 6 wherein the mapping apparatus is a handheld unit.

10. The mapping apparatus as recited in claim 6 further comprising a camera for capturing an image of the target.

11. The mapping apparatus as recited in claim 10 further comprising a software program to superimpose the image of the target onto the coordinate of the target such that the image is oriented to the coordinate.

12. The mapping apparatus as recited in claim 10 wherein the image is a digital image.

13. The mapping apparatus as recited in claim 6 further comprising a digital camera.

14. The mapping apparatus as recited in claim 6 wherein the continuous triggering, laser reflectorless rangefinder is mounted on a tripod.

15. The mapping apparatus as recited in claim 6 wherein the continuous triggering, laser reflectorless rangefinder is aimed using a scope.

16. The mapping apparatus as recited in claim 6 wherein the continuous triggering, laser reflectorless rangefinder is aimed optically.

17. The mapping apparatus as recited in claim 6 wherein the continuous triggering, laser reflectorless rangefinder is aimed automatically.

18. The mapping apparatus as recited in claim 6 wherein the continuous triggering, laser reflectorless rangefinder is aimed remotely.

19. The mapping apparatus as recited in claim 6 wherein the mapping apparatus further comprises a stepper motor to move the apparatus vertically.

20. The mapping apparatus as recited in claim 6 wherein the mapping apparatus further comprises a stepper motor to move the apparatus horizontally.

21. The mapping apparatus as recited in claim 6 wherein the mapping apparatus further comprises a transmitter to transmit data to a remote location.

22. A method of mapping a target as a photorealistic three dimensional model comprising the steps of:
- deploying a mapping apparatus at a target having two or more target control points;
- remotely commanding the mapping apparatus to emit a signal to the target with a continuous triggering, laser reflectorless rangefinder, to capture an oblique image of the target, wherein the image has two or more image control points, and to receive a reflected signal from the target; and
- transmitting data from the mapping apparatus to a remote location, wherein the data correlates a coordinate of each target control point with a corresponding image control point.

23. The method of mapping a target as recited in claim 22 wherein the mapping apparatus is deployed from the air.

24. The method of mapping a target as recited in claim 22 wherein the mapping apparatus obtains an image of the target.

25. The mapping apparatus as recited in claim 6 wherein the oblique image is taken from the ground.

26. The mapping apparatus as recited in claim 6 further comprising a software program to superimpose the oblique image of the attribute onto the coordinate of the attribute such that the oblique image is oriented to the coordinate.

27. The mapping apparatus as recited in claim 6 wherein the oblique image is a digital oblique image.

28. A method for rendering a photorealistic three-dimensional model, the method comprising the steps of:
- transmitting a signal to a target with a continuous triggering, laser reflectorless rangefinder, wherein the target has two or more target control points;
- receiving a reflected signal from the target via a signal reciever;
- processing the signal to determine a coordinate of the target;
- providing an oblique image of the target, wherein the oblique image has two or more image control points;
- correlating a coordinate of each target control point with the corresponding image control point; and
- generating a map of the target.

29. The method of mapping a target as recited in claim 28 wherein the oblique image is a digital oblique image.

* * * * *